United States Patent [19]

Haddad et al.

[11] Patent Number: 5,343,666
[45] Date of Patent: Sep. 6, 1994

[54] SPACE FRAME JOINT CONSTRUCTION

[75] Inventors: Charles J. Haddad, Bloomfield Township, Oakland County; Robert L. Maliszewski, Canton Township, Wayne County, both of

[73] Assignee: Ford Motor Company, Dearborn, Mich.

[21] Appl. No.: 967,886

[22] Filed: Oct. 28, 1992

[51] Int. Cl.$^5$ ............................................. F16B 7/04
[52] U.S. Cl. ................................... 52/648.1; 403/233; 403/237; 403/191; 52/726.1
[58] Field of Search ............... 403/237, 233, 191; 52/726.1, 726.2, 726.3, 726.4, 648.1; 296/197, 191, 205

[56] References Cited

U.S. PATENT DOCUMENTS

| | | |
|---|---|---|
| 1,707,230 | 4/1929 | Lowy . |
| 1,972,309 | 9/1934 | McMurchy . |
| 1,988,389 | 1/1935 | Mioton . |
| 2,016,702 | 10/1935 | Bauer . |
| 2,389,907 | 11/1945 | Helmuth . |
| 2,640,443 | 6/1953 | Schieler et al. . |
| 2,720,332 | 10/1955 | Holt . |
| 2,874,708 | 2/1959 | Daus, Jr. . |
| 3,093,219 | 6/1963 | Ramme . |
| 3,100,556 | 8/1963 | De Ridder . |
| 3,111,205 | 11/1963 | Gresham . |
| 3,228,717 | 1/1966 | Waller et al. . |
| 3,386,590 | 6/1968 | Gretz . |
| 3,387,418 | 6/1968 | Tyrer . |
| 3,456,966 | 7/1969 | Muller . |
| 3,472,301 | 10/1969 | Pearce, Jr. . |
| 3,665,778 | 5/1972 | Bohan et al. ................ 403/329 |
| 3,778,175 | 12/1973 | Zimmer . |
| 3,845,601 | 11/1974 | Kostecky . |
| 3,851,981 | 12/1974 | Corsi et al. . |
| 3,867,045 | 2/1975 | Beals . |
| 3,950,813 | 4/1976 | Buck ............................ 403/329 |
| 4,027,855 | 6/1977 | Lauzier . |
| 4,040,640 | 8/1977 | Begg . |
| 4,163,572 | 8/1979 | Benscoter . |
| 4,230,361 | 10/1980 | Nachbur et al. . |
| 4,355,844 | 10/1982 | Muzzarelli . |
| 4,390,164 | 6/1983 | Cokelekoglu . |
| 4,471,519 | 9/1984 | Capello et al. . |
| 4,489,659 | 12/1984 | Kamohara et al. ........... 403/237 |
| 4,557,091 | 12/1985 | Auer . |
| 4,618,163 | 10/1986 | Hasler et al. . |
| 4,652,170 | 3/1987 | Lew . |
| 4,660,345 | 4/1987 | Browning . |
| 4,676,545 | 6/1987 | Bonfilio et al. . |
| 4,712,942 | 12/1987 | Brown . |
| 4,726,166 | 2/1988 | DeRees . |
| 4,769,963 | 9/1988 | Meyerson . |
| 4,912,826 | 4/1990 | Dixon et al. . |
| 4,976,490 | 12/1990 | Gentle . |
| 4,986,597 | 1/1991 | Clausen . |
| 4,988,230 | 1/1991 | Banthia et al. . |
| 5,062,369 | 11/1991 | Cobden et al. . |
| 5,271,687 | 12/1993 | Holka et al. ................ 403/233 |

FOREIGN PATENT DOCUMENTS

| | | |
|---|---|---|
| 0061994 | 2/1982 | European Pat. Off. . |
| 0271137 | 11/1987 | European Pat. Off. . |
| 2701905 | 7/1977 | Fed. Rep. of Germany . |
| 2935158 | 3/1980 | Fed. Rep. of Germany . |
| 3529662 | 2/1987 | Fed. Rep. of Germany . |
| 3811427 | 10/1989 | Fed. Rep. of Germany . |
| 741735 | 12/1932 | France . |
| 1497184 | 8/1967 | France . |
| 57-87769 | 6/1982 | Japan . |
| 7511612 | 10/1975 | Netherlands . |
| WO8704679 | 8/1987 | PCT Int'l Appl. . |

*Primary Examiner*—Carl D. Friedman
*Assistant Examiner*—Wynn E. Wood
*Attorney, Agent, or Firm*—Daniel M. Stock; Roger L. May

[57] ABSTRACT

A space frame for an automotive vehicle includes a plurality of structural members and joint constructions for joining and locking at least a pair of the structural members together.

15 Claims, 3 Drawing Sheets

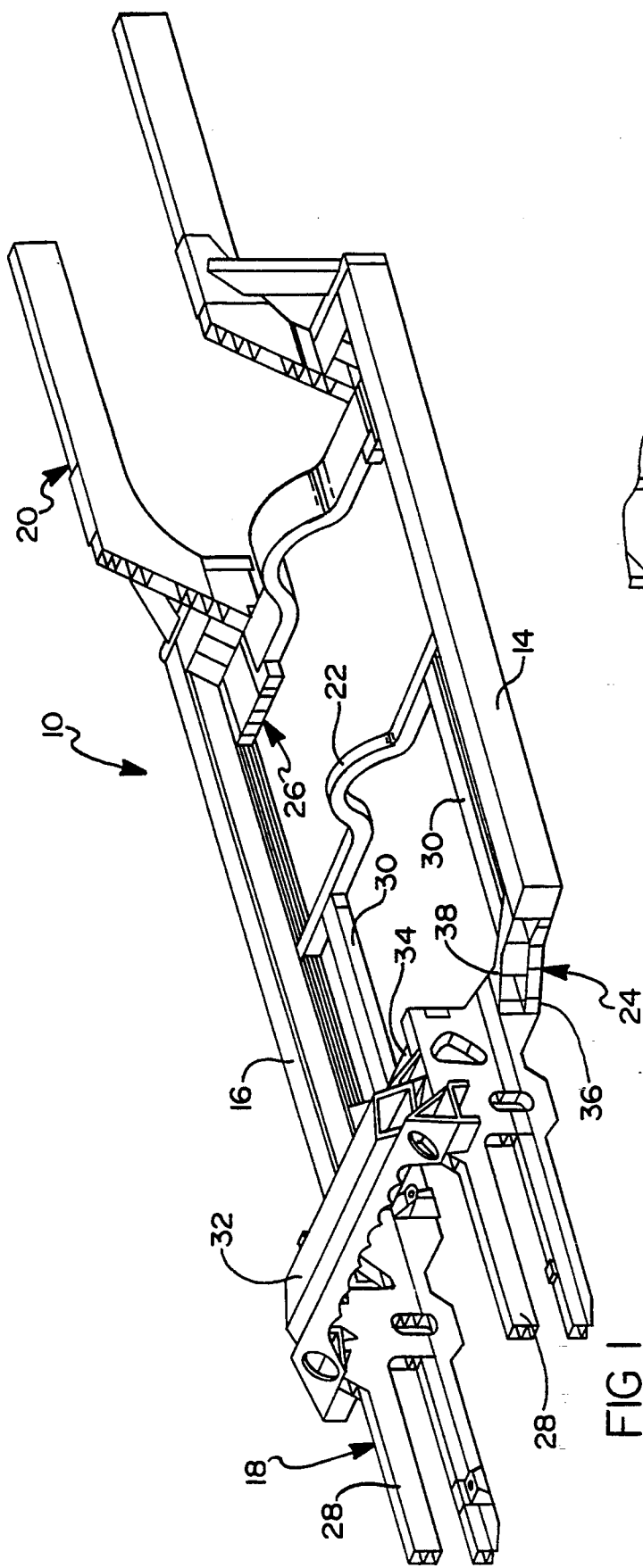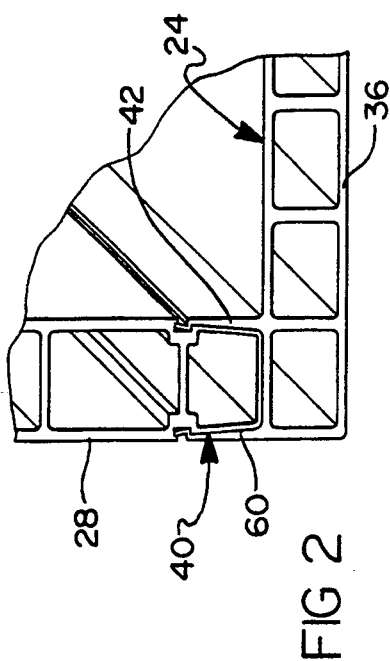

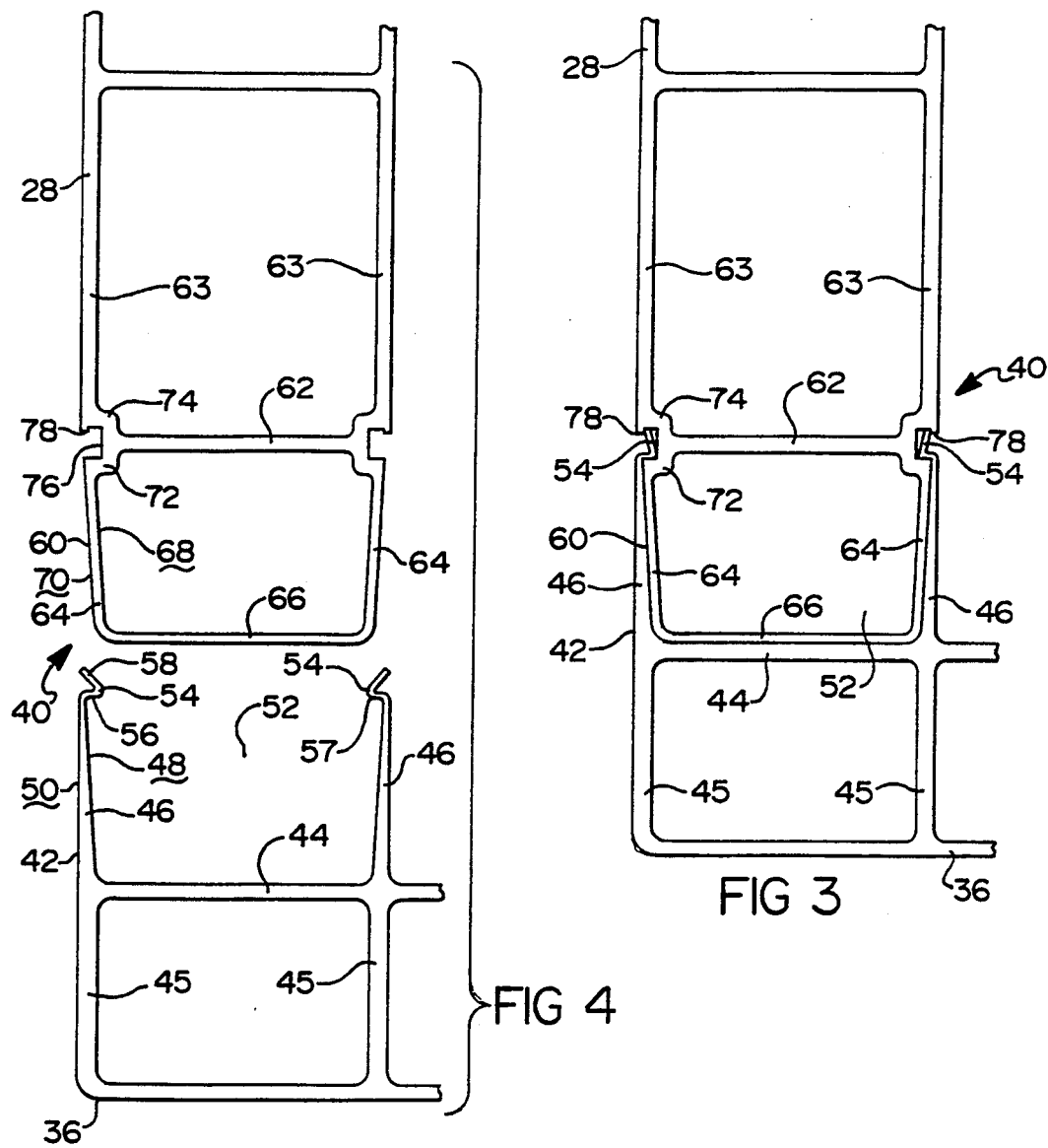

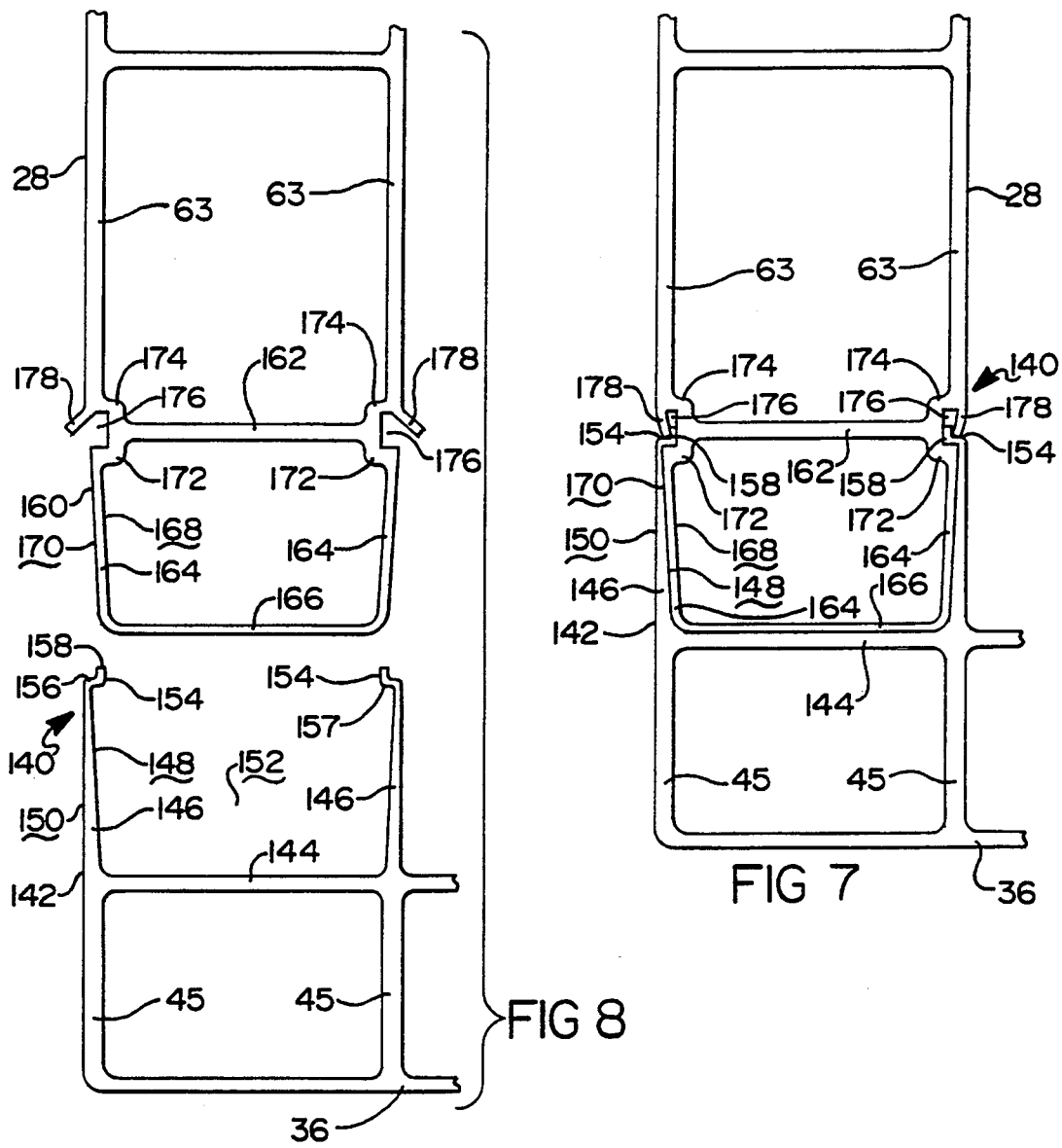

SPACE FRAME JOINT CONSTRUCTION

BACKGROUND OF THE INVENTION

1. Field of the Invention

The present invention relates generally to frame structures for automotive vehicles and, more specifically, to a joint used in the construction of such frames from lightweight materials.

2. Description of the Related Art

It is known to construct frames defining the general shape of an automotive vehicle and for supporting its various load-bearing functional components from metal components fabricated in a variety of manners. In the interest of enhancing the fuel economy of automotive vehicles, great attention has been given to fabricating vehicular components from lightweight materials. Consistent with this goal, automotive vehicles have been fabricated which use lightweight outer decorative panels fabricated from plastics which are fixedly secured to a structural inner frame or "space frame."

It is known to fabricate such space frames from a number of tubular members that are joined by fixed connectors to define the general shape of the vehicle. While this approach provides a distinct advantage in weight and in the tooling cost of manufacturing over the conventional fabrication of unibody construction through massive stampings, it suffers from the disadvantage that the connectors utilized for joining the tubular members together tend to be massive and expensive to fabricate and assemble. Also, these connectors suffer from the disadvantage that they do not provide a positive mechanical attachment for the tubular members of the space frame. Further, these connectors suffer from the disadvantage that they do not provide a positive mechanical attachment as an adjunct to adhesive bonding of the tubular members.

SUMMARY OF THE INVENTION

Accordingly, the present invention is a space frame for an automotive vehicle including a plurality of structural members. The space frame also includes joint means for joining and locking at least a pair of the structural members together.

One advantage of the present invention is that a space frame for an automotive vehicle is provided. Another advantage of the present invention is that a joint construction for a space frame is provided with positive mechanical attachment between the structural members while incorporating adhesive bonding. Yet another advantage of the present invention is that a joint construction for a space frame is provided with flush outer surfaces between the structural members. Still another advantage of the present invention is that an aluminum joint construction is provided which is lightweight and lower in cost to fabricate and assemble. A further advantage of the present invention is that the joint construction is provided for locating and securing the structural members together.

Other objects, features and advantages of the present invention will be readily appreciated as the same becomes better understood after reading the following description taken in light of the accompanying drawings.

BRIEF DESCRIPTION OF THE DRAWINGS

FIG. 1 is a perspective view of a space frame according to the present invention.

FIG. 2 is a perspective view of a joint construction, according to the present invention, for a front corner portion of the space frame of FIG. 1.

FIG. 3 is an elevational view of the joint construction of FIG. 2.

FIG. 4 is an exploded elevational view of the joint construction of FIG. 2.

FIG. 5 is an enlarged view of a portion of the joint construction of FIG. 2 during assembly.

FIG. 6 is a view similar to FIG. 5 after assembly.

FIG. 7 is an elevational view of an alternate embodiment of the joint construction of FIG. 2.

FIG. 8 is an exploded elevational view of the joint construction of FIG. 7.

FIG. 9 is an enlarged view of a portion of the joint construction of FIG. 7 during assembly.

FIG. 10 is a view similar to FIG. 9 after assembly.

DESCRIPTION OF THE PREFERRED EMBODIMENT(S)

Turning now to the drawings and in particular to FIG. 1 thereof, a space frame 10 according to the present invention is illustrated for a vehicle such as an automotive vehicle. The space frame 10 includes longitudinally extending side rails 14, 16, a front structural subassembly 18, a rear structural subassembly 20, a laterally extending central cross member 22 interconnecting the side rails 14, 16, respectively, and front and rear torque boxes 24, 26, respectively, interconnecting the front and rear structural subassemblies 18, 20 and the side rails 14, 16, respectively.

The front structural subassembly 18 includes a pair of spaced rail members 28 having a rear portion 30 which extends rearwardly to perpendicularly abut and to be fixedly secured by suitable means such as welding or adhesives to the central cross member 22. Preferably, the rail member 28 is a multicellular extruded structural member. The front structural subassembly 18 may include a suspension arm 32 spanning the rail members 28 to which it may be welded or adhesively secured. The front structural subassembly 18 may also include a steering column support member 34 positioned to span the rail members 28.

The torque box 24 is preferably fabricated as a two-piece assembly. The torque box 24 includes a lower and upper member 36, 38, respectively, which are multicellular extruded structural members. The lower and upper members 36, 38 are connected at one end to the side rails 14, 16 by suitable means such as welding or adhesives and are interlockingly connected at another end to the rail members 28 by joint constructions, according to the present invention and generally indicated at 40. It should be appreciated that the joint constructions 40 may be used for joining other structural members of the space frame 10.

The space frame 10 includes other structural members which are not labeled or specifically described to form the space frame 10 illustrated in FIG. 1. The structural members of the space frame 10 are tubular members extruded from a lightweight material such as an aluminum material and having a generally rectangular cross-section. It should be appreciated that other suitable lightweight materials and cross-sectional shapes may be used.

Referring to FIGS. 2 through 4, a joint construction 40 is illustrated for joining the rail member 28 and the lower member 36 together. The joint construction 40 includes a receiver portion 42 on the lower member 36. The receiver portion 42 has a generally rectangular shape. The receiver portion 42 has a base wall 44 interconnecting a pair of walls 45 of the lower member 36. The receiver portion 42 also has a pair of side walls 46 interconnected by the base wall 44. The side walls 46 have an inner surface 48 and outer surface 50. Preferably, the inner surface 48 is tapered to provide a width of the side wall 46 which is greater at the base wall 44 than at its free end. The side walls 46 are spaced laterally and substantially parallel to each other and generally perpendicular to the base wall 44 and cooperate together to form a channel 52 extending longitudinally. The receiver portion 42 also has a pair of opposed tongues or tabs 54 at the free ends of the side walls 46 for a function to be described. The tabs 54 have a ledge portion 56 extending generally perpendicular from the side walls 46 and inwardly across the channel 52 to form an open end 57 having a width less than a width of the channel 52. The tabs 54 also have a retainer portion 58 extending upwardly and outwardly at an angle from the ledge portion 56 for a function to be described.

The joint construction 40 also includes an extension portion 60 on the rail member 28 which is received in the receiver portion 42. The extension portion 60 has a generally rectangular shape. The extension portion 60 has a base wall 62 interconnected a pair of walls 63 of the rail member 28. The extension portion 60 also has a pair of side walls 64 interconnected at one end by the base wall 62. The extension portion 60 further has an end wall 66 interconnecting the other end of the side walls 64. The side walls 64 have an inner surface 68 and outer surface 70. Preferably, the side walls 46 are inclined such that the outer surface 70 matingly engages the inner surface 48 of the side walls 46 for the receiver portion 42. It should be appreciated that the side walls 64 are spaced laterally and the base and end walls 62, 66 are spaced and substantially parallel to each other.

The extension portion 60 also has a pair of spaced shoulders 72, 74 formed between the base wall 62 and side walls 64 and walls 63 of the rail member 28 to form a pair of opposed grooves or channels 76. The grooves 76 are generally rectangular in shape and receive the tabs 54 of the receiver portion 42 to be described. The extension portion 60 also includes a lip or flange 78 which extends generally perpendicular from the shoulder 74 and partially overlaps the channel 76 for a function to be described.

Preferably, the receiver portion 42 and extension portion 60 are integral with the lower member 36 and rail member 28, respectively, and formed as one-piece. The rail member 28 and lower member 36 are formed as extrusions from a lightweight material such as an aluminum material.

In operation, the rail member 28 and lower member 36 are fixedly secured or positively locked together by the joint construction 40. Typically, an adhesive such as a structural adhesive is disposed on the inner surfaces 48 of the side walls 46 and an inner surface of the base wall 44 for the receiver portion 42. Preferably, the structural adhesive is an acrylic adhesive. An example of such an acrylic adhesive is found under the trade name Versilok acrylic adhesive (AD5830) of the Lord Corporation. It should be appreciated that other suitable adhesives may be used. It should also be appreciated that the inner surfaces of the receiver portion 42 may be pre-coated with adhesive.

Next, the extension portion 60 of the rail member 28 is disposed within the receiver portion 42 of the lower member 36 by sliding the extension portion 60 through an open end of the channel 52 of the receiver portion 42. When this occurs, the tabs 54 of the side walls 46 are disposed in the grooves 76 as illustrated in FIG. 5. A suitable device such as a circular roller or blade (not shown) hits or contacts the retainer portion 58 which is flexed or moved inwardly into the groove 76 behind the flange 78. Then, the retainer portion 58 flexes or moves outwardly and upwardly to be disposed between the flange 78 and shoulder 74 as illustrated in FIG. 6. It should be appreciated that an adhesive may be disposed in the groove 76 to secure the tabs 54 to the extension portion 60. It should also be appreciated that the tabs 54 are snap-fitted in the grooves 76 due to the flange 78.

Referring to FIGS. 7 through 8, an alternate embodiment 140 of the joint construction 40 is shown. Like parts of the joint construction 40 have like reference numerals increased by one hundred (100). The joint construction 140 includes the receiver portion 142 and extension portion 160. For the receiver portion 142, the tabs 154 at the free ends of the side walls 146 have a ledge portion 156 extending inwardly and a retainer portion 158 extending upwardly and generally perpendicular. For the extension portion 160, the flange 178 extends outwardly at an angle from the shoulder 174 and partially, preferably substantially, overlaps the groove 176. When the tabs 154 are disposed in the grooves 176 as illustrated in FIG. 9, a suitable device such as a circular roller or blade (not shown) hits or contacts the flange 178 which is moved inwardly in the groove 176 to retain the retainer portion 158 therein.

Accordingly, the tabs 54, 154, grooves 76, 176 and flanges 78, 178 of the joint constructions 40, 140 provide for locating and securing the structural members together and a positive mechanical attachment therebetween. Also, the joint constructions 40, 140 provide a positive mechanical attachment between the structural members while the adhesive cures. Further, the outer surfaces 50, 150 of the receiver portion 42, 142 and the outer surfaces 70, 170 of the extension portion 60, 160 are substantially flush for provide a flush exterior surface to the space frame 10.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A space frame for an automobile vehicle, comprising:
    a plurality of structural members;
    joint means for joining and locking at least a pair of said the structural members together;
    said joint means comprising channel means forming a channel on one of said structural members, extension means forming an extension on another of said structural members, and locking means for locking said extension into said channel;
    said locking means comprising means forming a pair of grooves on opposed sides of said extension, and means forming a pair of opposed tabs on opposed sides of said channel, said tabs having a ledge portion extending inwardly into said grooves and a retainer portion extending from said ledge portion; and said extension having a flange at least partially overlapping each of said grooves, either one of said retainer portion and said flange being moved inwardly such that said retainer portion is disposed behind said flange and retained in said groove.

2. A space frame as set forth in claim 1 wherein said retainer portion extends outwardly at an angle from said ledge portion.

3. A space frame as set forth in claim 1 wherein said flange extends outwardly at an angle.

4. A space frame as set forth in claim 1 wherein said joint means includes an adhesive disposed between said channel means and said extension means.

5. A space frame as set forth in claim 1 wherein said structural members are made of an aluminum material.

6. A space frame as set forth in claim 1 wherein said joint means is made of an aluminum material.

7. A space frame for an automobile vehicle, comprising:

at least a pair of structural members;

one of said structural members having a receiver portion and the other of said structural members having an extension portion;

locking means for locking said structural members together such that said extension portion is disposed in said receiver portion; and said locking means comprising means forming a pair of grooves on opposed sides of said extension portion, and tabs on said receiver portion, said tabs having a ledge portion extending inwardly into said grooves and a retainer portion extending from said ledge portions, said extension portion having a flange at least partially overlapping each of said grooves, either one of said retainer portion and said flange being moved such that said retainer portion is disposed behind said flange and retained in said groove.

8. A space frame as set forth in claim 7 wherein said receiver portion has a first base wall and a pair of spaced first side walls interconnected by said first base wall to form a channel.

9. A space frame as set forth in claim 8 wherein said extension portion has a second base wall, an end wall spaced from said second base wall, and second side walls interconnected between said base wall and end wall.

10. A space frame as set forth in claim 7 wherein said retainer portion extends outwardly at an angle from said ledge portion.

11. A space frame as set forth in claim 10 wherein said flange extends perpendicularly from said extension portion.

12. A space frame as set forth in claim 7 wherein said retainer portion extends substantially perpendicularly from said ledge portion.

13. A space frame as set forth in claim 12 wherein said flange extends outwardly at an angle from said extension portion.

14. A space frame as set forth in claim 7 including an adhesive disposed between said receiver portion and said extension portion.

15. A space frame for an automobile vehicle, comprising:

at least a pair of structural members;

one of said structural members having a receiver portion and the other of said structural members having an extension portion, said extension portion being disposed in said receiver portion;

said receiver portion having a first base wall and a pair of spaced first side walls interconnected by said first base wall to form a channel;

said extension portion having a second base wall, an end wall spaced from said second base wall, and second side walls interconnected between said second base wall and end wall;

means forming a pair of grooves on opposed sides of said extension portion;

at least one tab on each of said first side walls, said tabs being disposed in said grooves;

said tabs having a ledge portion extending inwardly into said channel and a retainer portion extending from said ledge portion; and said extension portion including a flange partially overlapping said groove, either one of said retainer portion and said flange being moved inwardly such that said retainer portion is disposed behind said flange and retained in said groove.

* * * * *